Feb. 11, 1930.                    E. R. VIBERG                    1,746,749
                                   BOX CAR DOOR
                               Filed Jan. 9, 1926           2 Sheets-Sheet 1
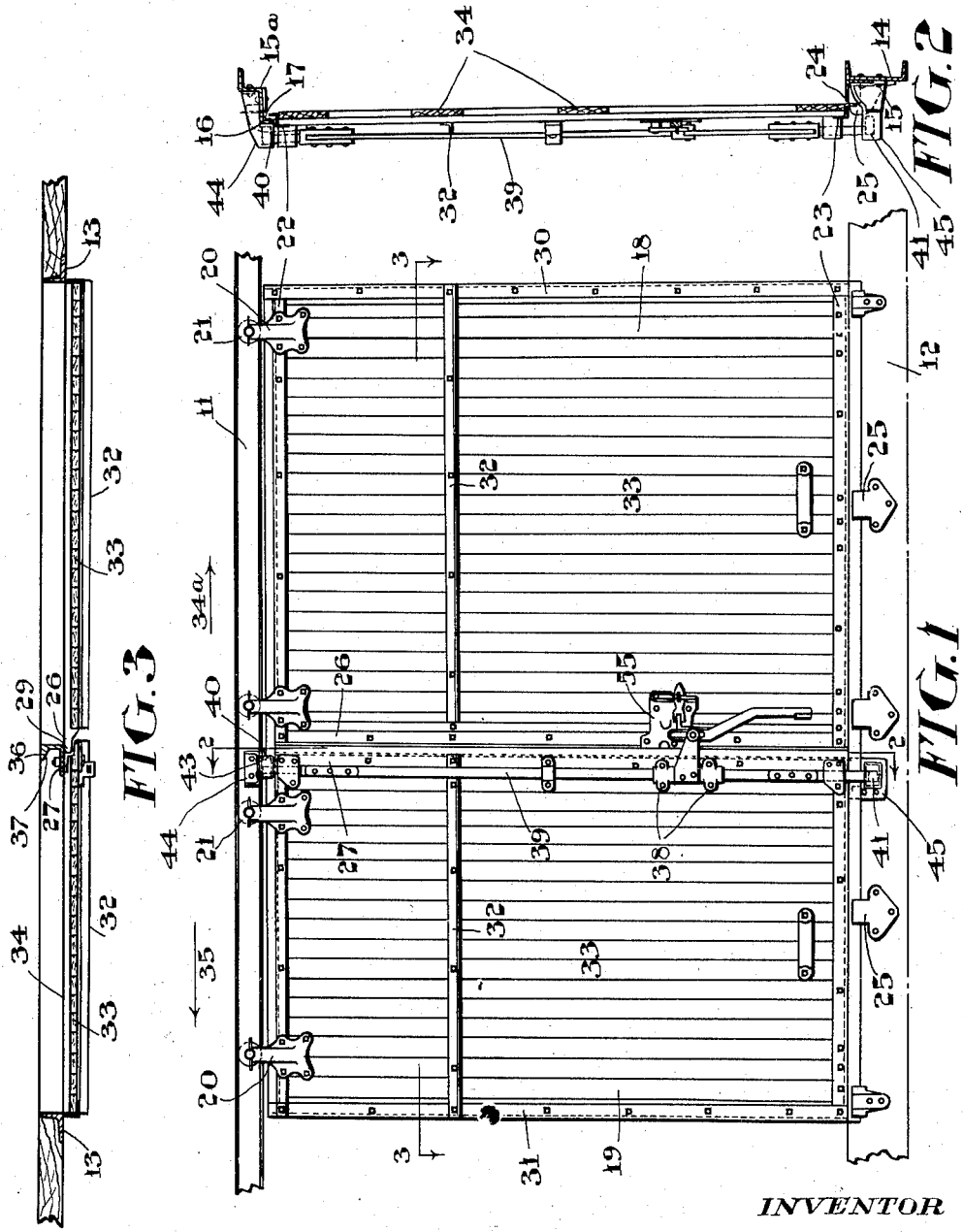
INVENTOR
ERNEST. R. VIBERG
BY Featherstonhaugh & Co
ATTORNEYS

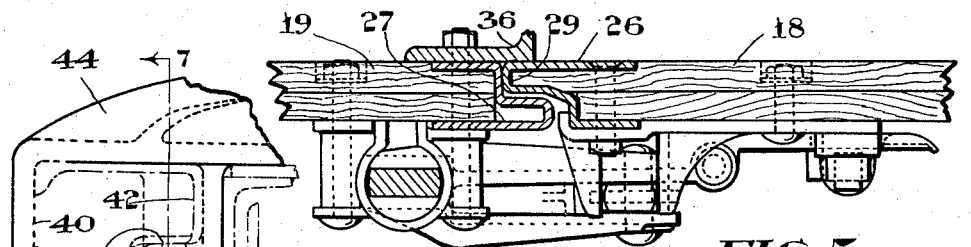
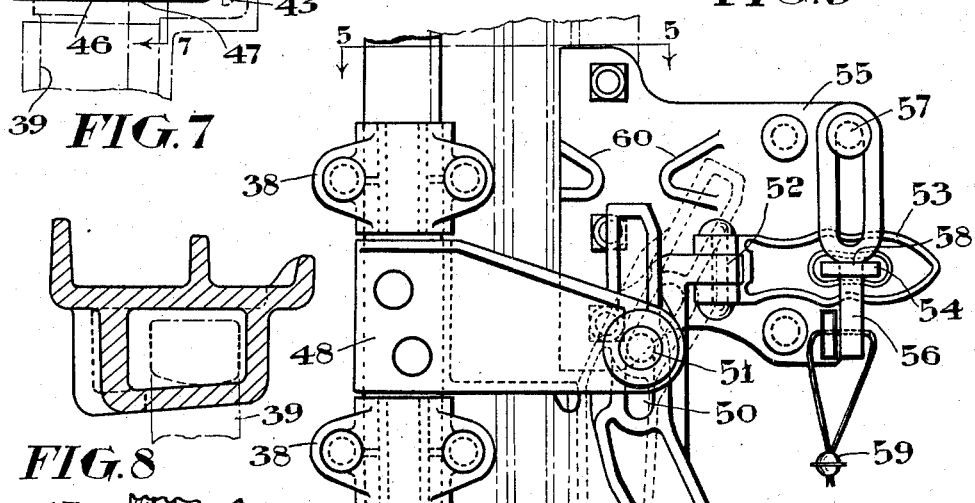
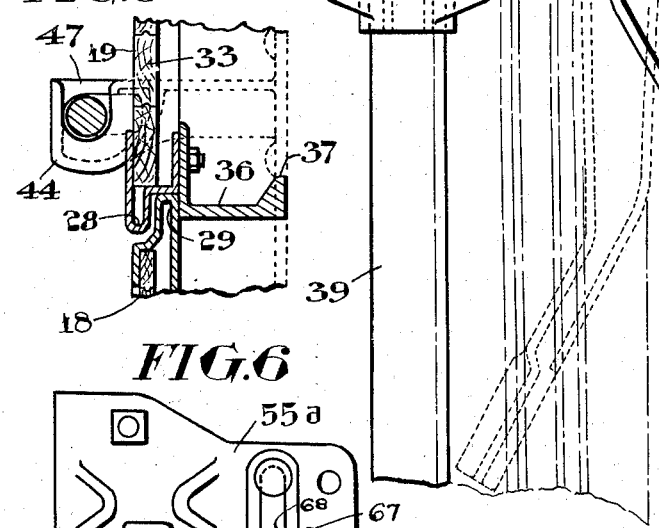
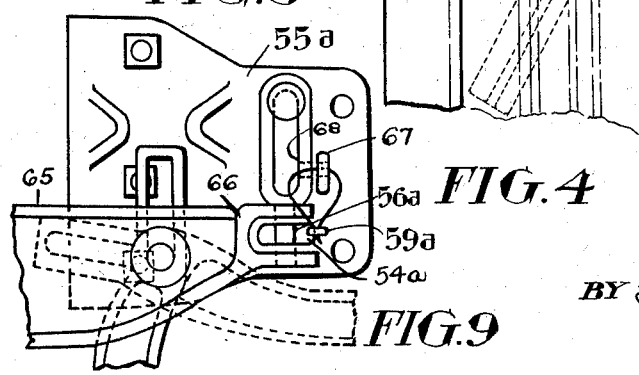

Patented Feb. 11, 1930

1,746,749

UNITED STATES PATENT OFFICE

ERNEST R. VIBERG, OF MONTREAL, QUEBEC, CANADA

BOX-CAR DOOR

Application filed January 9, 1926. Serial No. 80,277.

This invention relates to new and useful improvements in box car construction and particularly to the side door construction and operating mechanism therefor.

Some box cars are specially designed for carrying automobiles or such like bulky freight and very often these same cars are used for carrying general merchandise, grain or the like. Such cars are usually provided with an extra large door opening, each closed by means of two doors, one of which may be locked in position when the car is used for transporting grain or general merchandise. For the automobile trade the door opening must be at least 10 feet, whereas for general merchandise a 6 feet opening is all that is necessary. It is therefore customary to make the doors for the large opening of two sizes, one, the larger, being designated the main door and the other, the smaller or auxiliary door which may be provided with means for locking it in position. In box cars of this type at present in use, when two sliding doors are used to cover one opening, it is customary to place a removable post inside the car and means for locking the post at its top and bottom to the car sills, so that temporary post is provided for the doors to close against. This post also prevents the lading from bulging at the junction between the doors. The posts referred to have been made very heavy and difficult to handle and once the doors are closed there is no assurance that the post has been properly secured or locked in its position, a very unsatisfactory state of affairs, especially when handling grain or general merchandise.

The main object of this invention is to provide a simple and highly efficient car of the class stated in which the doors will be so constructed that no removable posts will be required.

Another object is to provide an auxiliary car door having means which will prevent the door from bulging said means, also serving as a supplementary attachment for grain doors.

A further object is to provide car doors, of the class stated which will be weatherproof and reinforced at the centre or abutting edges.

A still further object is to provide a box car in which means will be provided in the auxiliary door to prevent the doors from moving outwardly from their guides due to the pressure of the lading.

A still further object is to provide doors for box cars having means which will lock the doors together and one of them to the upper and lower members of the door opening.

A still further object is to provide a box car of the class stated having door locking means, door starting and closing means, and also sealing means which will be operated from a common source and which will be placed in such a position that they will be easily inspected by the trainman before undertaking a journey or even before leaving the loading station.

In my invention, I provide double car doors for closing a large opening on the side of a car. Rotatably mounted in brackets secured to the auxiliary car door is a bar, the upper and lower ends of which are provided with projections which fit into pockets in brackets secured to the car door sills. The pockets have inclined angle surfaces which form wedges which engage with the projections, thereby placing said bar in tension to replace the post that is usually utilized in cars of this type. The auxiliary door is, also provided with inside reinforcing means to prevent the door from bulging. The reinforcing means extends from top to bottom of the door, and the locking bar is made of sufficient strength to form an intermediate removable door post to prevent spreading of the lintel of the door and to take care of the bending and shearing stresses due to lading. The locking means for the bar are exposed and operated from a handle, so constructed that it may also be used as a door starter and a door closer.

In the drawings which illustrate one form of my invention:

Figure 1 is a side elevation of a pair of car doors slidably mounted on suitable framing or car door sills.

Figure 2 is a sectional elevation of a pair of car doors taken on the line 2—2 Figure 1.

Figure 3 is a sectional plan of the doors taken on the line 3—3 Figure 1.

Figure 4 is an enlarged elevation of the door locking and opening and closing mechanism.

Figure 5 is a sectional plan taken on the line 5—5 Figure 4.

Figure 6 is a sectional plan of the centre of the door showing the locking means.

Figure 7 is a side elevation of the locking bracket secured to the door framing.

Figure 8 is a sectional back elevation of the locking bracket taken on the line 7—7 Figure 7.

Figure 9 is a modification of the door sealing device.

Referring more particularly to the drawings, 11 designates the side plate, 12 the sill and 13 the side frame members of a door opening of a box car. The sill comprises a channel shaped member 14 having an outwardly extending angle member 15 rivetted or otherwise secured thereto, see Figure 2. The side plate comprises a Z-shaped member 15ª, an outwardly projecting plate 16 and an angle 17 secured to the plate and having one leg of the angle projecting downwardly from the plate. The side frame members may be of any desired construction and are shown as angle members which are adapted to be secured to the side plate and sill. The door opening is closed by a pair of doors, the main or larger door 18 and the auxiliary or smaller door 19. The doors are suspended from hangers 20, which are provided with rollers 21, engaging with the side plate. The upper and lower members 22 and 23 of the doors may be made of Z construction, adapted to prevent the door from moving outwardly from the side of the car body. The upwardly projecting leg of the member 22 is positioned between the body of the car and the angle 17 and in close proximity to the inner face thereof. The downwardly projecting leg of the member 23 is positioned between the bottom sill and the inner surface 24 of the guide bracket 25 secured in any suitable manner to the bottom sill. The adjacent vertical members 26 and 27 of the doors 18 and 19 are of same depth but are so formed that the outwardly projecting portion 28 of the member 27 overlaps a portion of the outwardly projecting portion 29 of the member 26 to form a sealed or watertight joint for the car when the doors are in the closed position as shown in Figures 1 and 3 and in enlarged detail in Figures 5 and 6. The other vertical members 30 and 31 of the doors may be of any of the well known structural shapes suitably attached to their adjacent door members. Horizontal bracing members 32 may extend between the vertical members of the doors and vertically disposed tongue and groove boarding 33 may extend between the upper and lower members of the door and be attached thereto by any suitable means. Horizontal bracing battens 34 may extend from edge to edge of the door to strengthen same. To open the doors the larger door is moved in the direction of arrow 34ª and the smaller door in the direction of arrow 35. The foregoing construction is very much similar to the standard construction of doors of this class and may be subject to slight alteration according to requirements. Extending from top to bottom of the door and secured to the inner surface of the member 27 is the reinforcing member 36 which may be made of bulb angle construction, the bulb portion 37 of which will form a seating for a grain car door (not shown). This reinforcing member prevents bulging of the car door 19 due to outward pressure of the merchandise held within the car. The smaller door is usually locked in position when the car is being used for carrying small merchandise, the use of the larger door being all that is necessary for loading or unloading the car. Rotatably mounted in suitably spaced brackets 38 is the locking bar 39, the ends 40 and 41 of which extend above and below the horizontal framing members of the door respectively. The ends have projections 42 extending outwardly at right angles to the main body of the bar and are adapted to fit into pockets 43 formed in the brackets 44 and 45, secured in any suitable manner to the side plate and sills of the door opening. The adjacent inner surfaces 46 of these pockets are inclined to place the bar in tension when the door is in the locked position. Slots 47 are formed in the sides of the brackets to allow the bar to be easily placed into its locking position. When the bar is turned, the adjacent surfaces of the projections 42 engage with the inclined surfaces of the pockets to put said bar in tension. Positioned between two of the brackets 38 and secured to the bar 39 is the handle bracket 48. The handle 49 is provided with a slot 50 to allow same to be moved to any desired position on the pin 51 passing through the bracket 48 and the slot 50. Extending outwardly from the bracket 48 is the lug 52 and hingedly attached to said lug is the hasp 53 which passes over an apertured lug 54 formed in a bracket 55 secured to te car door 18. A locking bolt 56 is slidably mounted on a pin 57 secured to the bracket 55. Part of said bolt is adapted to slide into the aperture 58 in the lug 54 and slots may be formed in the lowermost end of said bolt and in the bracket 55 to allow for the easy passage of a seal, designated 59. Projecting outwardly from the face of the bracket 55 and above the slotted end of the handle when the door is in the closed position are door starting and closing webs 60. These webs are spaced from one another so that the end of the handle may pass therebetween and when said handle is pivoted on the pin 51, it will engage with one of the webs to force the doors towards or away from one another. In the modification shown in Figure 9, the bracket 65 which is attached to the locking bar 39, in a similar manner to the bracket 48 is provided with an extension 66, the end of which is bifurcated and adapted to embrace the eye bolt or apertured lug 54ª formed in the bracket 55ª. The locking bolt 56ª is mounted on the bracket 55ª in a similar manner to the bolt 56, and passes through the eye bolt or apertured lug 54ª. A sealing lug 67 may be formed on the bracket 55ª and seal 59ª may be passed through the lug and a slot 68 formed in bolt 56ª to seal the car door. Other modifications may be made in the construction of the various parts, without departing from the spirit of the invention.

The operation of the device is as follows: The smaller door is closed by moving it towards the center of the door opening until the projections on the locking bar enter the pockets of the locking brackets, slots being provided for that purpose. The handle is then used to turn the locking bar so that the projections will engage with the inclined surfaces of the pockets, placing the bar in tension. It will be easily seen that the reinforcing member within the door will prevent bulging of same between its upper and lower edges and the locking bar will take care of the bending and shearing stresses caused by the pressure of the lading as it is made strong enough at these points to resist same. The locking bar forms a tie, tension member or intermediate movable door post which when locked in position prevents spreading between the side plate and the sill, a source of weakness in cars of this type at present in use. The larger door may then be closed. The adjacent edges of the doors are in overlapped relationship to form a raintight joint between them. The reinforcing member may be also positioned to form a channel between it and the projection 28, so that the edge of the main door may fit thereinto. To assist in closing the door the handle is moved upwardly in the slot 50 on the pin 51, until the end of the handle passes between the webs in the bracket secured to the main door. By pulling the handle in the direction indicated by arrow X the doors are brought closely together so that the hasp may be easily passed over the apertured lug and the locking bolt slid therethrough and the seal placed in position. To open the door the handle is pulled into the position shown in dotted lines in Figure 4, after the seal has been broken, the locking bolt withdrawn and the hasp swung out of engagement with the apertured lug.

The device is very simple in construction and operation, and provides a means whereby a box car built for carrying automobiles and such like bulky material may be quickly and conveniently used for carrying grain or general merchandise, as no removable posts are used, the door being so built that it is properly reinforced and supported at the point where it is most needed, namely the centre of the door. There are no loose parts to be carried or installed as the reinforcing member equivalent to the post at present in use, is carried by the door and secured thereto. The adjacent edges of the doors are so constructed that they are weatherproof and the reinforcing member may be used as a support for any supplementary framing, such as grain doors. The starting and closing of the main door is operated from the same handle as the auxiliary door locking mechanism, so that the hasp locking bolt and seal may be easily placed in position before the car leaves the loading point. Another feature is that all locking mechanism is exposed so that the car may be inspected by the trainman who can be assured that the car is in condition to undertake long journeys, a feature which is impossible when removable posts are used.

Having thus described my invention, what I claim is:—

1. In combination with a railway box car having a door opening, a pair of doors slidably supported to move over said opening, the inner adjacent edges of said doors being in overlapping relationship, a reinforcing member secured to the inner edge of one of the doors and extending from top to bottom of same, and a locking bar on the edge of the same door but on the opposite side thereof, said bar extending beyond the upper and lower edges of the door and engageable with suitable bearings secured to the car to hold the door in its closed position and to prevent displacement of same, said bar and bearings being formed with coacting engaging portions functioning, in one position of the bar, to place the latter under tension in such manner that the sill and side plate of the door opening are tied together.

2. In combination with a railway box car having a door opening, a pair of doors slidably supported to move over said opening, the inner edges of said doors being in overlapping relationship when closed, a reinforcing member secured to the inner edge of one of the doors and extending for the full depth of same, said member being provided with an inwardly projecting portion adapted to support a grain door, and a rotatably mounted locking member secured to the outside of the reinforced door and extending above the upper and lower edges thereof, brackets secured to the sill and side plate elements of the door opening and engageable with said bar, the engaging portions of said bar and brackets being designed to effect tensioning of the bar when the latter is in a predetermined position whereby the sill and lintel elements are tied together to prevent separation thereof.

3. In combination with a railway box car having a door opening, a pair of doors slidably supported to move over said opening, the adjacent edges of said doors being in overlapping relationship when closed, a locking bar rotatably mounted on the outer face of one of the doors having its terminals projecting above and below said door, brackets secured to the sill and lintel elements of the door opening and provided with inclines cooperating with the projecting terminals of said bar to place the bar under tension and to thereby secure said lintel and sill elements against independent deflection, and a reinforcing member extending along one edge from top to bottom of said locked door and secured to the inner face thereof.

4. In combination with a railway box car having a door opening, a main and an auxiliary door slidably supported to move over said opening, a reinforcing member secured to the inner edge of the auxiliary door adjacent the main door, a plurality of spaced brackets secured to the outer face of the auxiliary door, a locking bar rotatably mounted in said brackets, and extending beyond the upper and lower edges of the auxiliary door, and brackets secured to the car near the centre of the opening, said brackets having pockets formed therein and being slotted to provide entrance openings through which the ends of the locking member are inserted in said pockets, the bottom walls of the pockets being inclined to cooperate with the ends of the locking member in effecting tensioning of said member when the latter is in a predetermined position.

5. In combination with a railway box car having a door opening, a main and an auxiliary door slidably supported to move over said opening, and in overlapping relationship at their adjacent edges when closed, a reinforcing member secured to the inner edge of the auxiliary door and adjacent the main door to form a channel to receive same, said auxiliary member extending inwardly towards the inside of the car, and a rotatably mounted locking bar secured to the outer face of the auxiliary door and engaging with brackets secured to the car above and below the door to prevent displacement of the door due to the lading in the car, said locking bar being under tension when the auxiliary door is closed.

6. A device according to claim 5 having the locking member extending beyond the upper and lower edges of the door projections at the end of said bars adapted to slide into slots in the brackets secured to the car and pockets in said brackets formed to receive said projections and to effect tensioning of the bar.

7. In combination with a railway box car having a door opening, a main and an auxiliary car door slidably supported to move over said opening, a reinforcing member extending along one vertical edge of the inner face of the auxiliary door, a rotatably mounted locking member secured to the outer face of one edge of the auxiliary door and extending above the upper and lower edges of same, projections on said locking member extending at right angles thereto, brackets secured to the car, slots in the brackets to allow free entry of said ends, pockets in said brackets to allow rotation of said ends therein, and horizontally disposed wedges formed in the brackets to exert a pull on said locking member on rotation of same within the bracket.

8. In a device of the character described, a main door and an auxiliary door slidably supported and adapted to cover an opening in the side of a car, a reinforcing member secured to the inner edge of the auxiliary door adjacent the main door to prevent bulging of the door due to lading, a locking member rotatably mounted on the face of the auxiliary door and adapted to be tensioned by engagement with brackets secured to the car at the top and bottom of the car opening, a bracket secured to the locking member, and an operating handle slidably mounted on said bracket, a hasp hingedly secured to said bracket, means secured to the main door and engageable with said hasp to lock the doors together.

9. In a box car, a main door and an auxiliary door slidably supported and adapted to cover an opening in the side of the car, a reinforcing and supplementary door support secured to the inner edge of the auxiliary door, guides for said door, a locking bar extending above and below the door and engaging with brackets secured to the car, said bar being rotatably mounted on the auxiliary door and adapted to be tensioned when turned in said brackets to lock the auxiliary door, a bracket extending from said bar, a handle slidably mounted on the bracket and adapted to operate said locking bar.

10. A railway box car having a door opening, door means for closing said opening upper and lower member secured respectively to the side plate and sill elements of the door opening at the approximate center thereof, a bar extending vertically between said members and having its terminals removably engaged therewith, said bar being carried by said door means and rotatable with respect to said members, the engaging surfaces of the bar and members being designed to effect tensioning of the bar when the latter is rotated to a predetermined position whereby the sill and side plate of the doorway are tied together against independent deflection.

11. In combination with a railway box car having a door opening, a pair of doors for closing said opening, said doors having adjacent edges in overlapping relationship when